United States Patent
Fargo et al.

(10) Patent No.: US 10,688,852 B2
(45) Date of Patent: Jun. 23, 2020

(54) QUICK RELEASE CANISTER

(71) Applicant: RETRAX HOLDINGS, LLC, Ann Arbor, MI (US)

(72) Inventors: Jonathan Charles Fargo, Grand Forks, ND (US); Steve Givens, Grand Forks, ND (US); Hunter Craig Eslinger, Beulah, ND (US); Jesse Johnson, Saint Michael, MN (US); Michael P. Pare, Cheyenne, WY (US); Matthew James Schuster, Wahpeton, ND (US)

(73) Assignee: RETRAX HOLDINGS, LLC, Ann Arbor, MI (US)

( * ) Notice: Subject to any disclaimer, the term of this patent is extended or adjusted under 35 U.S.C. 154(b) by 98 days.

(21) Appl. No.: 16/110,499

(22) Filed: Aug. 23, 2018

(65) Prior Publication Data
US 2020/0062093 A1   Feb. 27, 2020

(51) Int. Cl.
*B60J 7/10* (2006.01)
*B60J 7/08* (2006.01)
*B62D 65/06* (2006.01)

(52) U.S. Cl.
CPC .............. *B60J 7/104* (2013.01); *B60J 7/085* (2013.01); *B62D 65/06* (2013.01)

(58) Field of Classification Search
CPC . B60J 7/104; B60J 7/085; B60J 7/067; B62D 65/06
USPC .................................................... 296/100.12
See application file for complete search history.

(56) References Cited

U.S. PATENT DOCUMENTS

| | | | |
|---|---|---|---|
| 3,146,824 A | 9/1964 | Veilleux | |
| 3,516,469 A | 6/1970 | McDonald | |
| 3,854,770 A | 12/1974 | Grise et al. | |
| 4,479,677 A | 10/1984 | Gulette et al. | |
| 4,563,034 A | 1/1986 | Lamb | |
| 4,611,848 A * | 9/1986 | Romano | B60J 7/068 |
| | | | 160/133 |
| 4,786,099 A | 11/1988 | Mount | |
| 4,792,178 A | 12/1988 | Kokx | |
| 4,889,331 A | 12/1989 | Tamblyn et al. | |
| 5,040,843 A | 8/1991 | Russell et al. | |
| 5,251,950 A | 10/1993 | Bernardo | |
| 6,053,556 A | 4/2000 | Webb | |
| 6,328,365 B1 * | 12/2001 | Adsit | B60R 9/00 |
| | | | 296/148 |
| 6,848,734 B1 | 2/2005 | Mulvaney | |
| 7,052,066 B2 * | 5/2006 | Emery | B60R 11/06 |
| | | | 296/37.1 |
| 7,404,586 B2 | 7/2008 | Seiberling | |
| 8,087,713 B2 | 1/2012 | Schrader et al. | |
| 9,399,390 B1 | 7/2016 | Shortz, Jr. | |
| 2003/0230909 A1 * | 12/2003 | Melius | B60J 7/067 |
| | | | 296/98 |

* cited by examiner

*Primary Examiner* — Pinel E Romain
(74) *Attorney, Agent, or Firm* — The Dobrusin law Firm, P.C.

(57) ABSTRACT

A canister comprising: (a) a space configured to receive a tonneau cover so that the tonneau cover is stored within the canister; and (b) one or more track guides that guide the canister relative to a roller track, a bed of a vehicle, a rail extension, a cap, or a combination thereof; and wherein the one or more track guides assist the canister in being inserted into or removed from the bed of the vehicle.

20 Claims, 8 Drawing Sheets

QUICK RELEASE CANISTER

FIELD

The present teachings relate to a truck bed cover that is storable within a canister and more specifically a canister that is removable and insertable into a tonneau system without removal of all components of the tonneau system.

BACKGROUND

Tonneau systems cover an open area of a vehicle and generally cover an open area of a pick-up truck (i.e., a bed). Multiple different types of tonneau systems are available, with some of the tonneau covers being solid and opening about a pivot, some folding upon themselves, and others rolling up. With the roll up type covers the covers roll up into a canister that stores the cover, while the tonneau system is in the stored position. In order to free up space within the vehicle bed some canisters have been placed outside of the bed. Some of the canisters when located outside of the bed remain visible and the tonneau system does not have a flat lay out. In other tonneau systems, the canister remains located within the vehicle bed using up space that could be available for other components. If a user desired to use the entire vehicle bed, substantially all of the tonneau system would need to be removed so that the truck bed could be free of the tonneau system. However, adding and removing the entire tonneau system can be time consuming and may detract a user from attempting to remove the canister and/or tonneau system from the bed of the vehicle. Attempts have been made to make removable tonneau systems however, these systems include removal of rails, tracks, and other components in addition to the canister, which may need tools in order to add and remove portions of the tonneau system from the vehicle bed.

Examples of tonneau systems are found in U.S. Pat. Nos. 3,516,469; 4,479,677; 4,786,099; 5,040,843; 6,848,734; and 8,087,713 all of which are expressly incorporated herein by reference for all purposes. It would be desirable to have tonneau system where the canister is removable without removal of any other components. What is needed is canister that is quick release and quick insert into the tonneau system. It would be desirable to have a canister that is removable without using any tools. What is needed is a tonneau system that guides the canister into place and out of place so that the tracks of the canister and the roller tracks are moved into alignment and out of alignment so that tonneau cover may be extended and retracted. It would be desirable to have a method of adding and removing a canister from a tonneau system without removal of any other components of the tonneau system.

SUMMARY

The present teachings seek to help solve one or more of the problems/issues disclosed above. The present teachings are particularly directed to regulating movement of the truck bed cover into and out of a canister of the tonneau system.

Accordingly, pursuant to one aspect of the present teachings provide: a canister comprising: (a) a space configured to receive a tonneau cover so that the tonneau cover is stored within the canister; and (b) one or more track guides that guide the canister relative to a roller track, a bed of a vehicle, a rail extension, a cap, or a combination thereof; and wherein the one or more track guides assist the canister in being inserted into or removed from the bed of the vehicle.

The present teachings provide: a tonneau system comprising: (a) a roller track that is configured to connect to a first side of a bed of a vehicle; (b) a second roller track that is configured to connect to a second side of the bed of the vehicle; (c) a rail extension connected to the roller track on the first side; (d) a second rail extension connected to the second roller track on the second side; (a) a canister including: (i) a track guide on a first side of the canister in communication with the roller track and the rail extension on the first side, and (ii) a second track guide on a second side of the canister in communication with the second roller track and the second rail extension on the second side; and (f) a bearing connected to the rail extension and a second bearing connected to the second rail extension so that the bearing guides the canister as the canister is being inserted into or removed from the bed of the vehicle; wherein the roller track and the second roller track remain connected to the bed of the vehicle when the canister is removed from the bed of the vehicle.

The present teachings provide: a method comprising: (a) moving a canister in a first direction relative to one or more roller tracks, one or more rail extensions, or both so that a bearing moves relative to a track guide from a position within a guide lock of the track guide to a position within a movement pocket of the track guide; (b) moving the canister in a second direction so that the bearing moves from the movement pocket to a guide neck of the track guide; and (c) moving the canister in a third direction so that the bearing moves from the guide neck, along one or more track legs, and out of a track opening of the track guide so that the canister is moved in a third direction; wherein the one or more roller tracks, the one or more rail extensions, or both are free of movement as the canister moves.

The present teachings provide a tonneau system where the canister is removable without removal of any other components. The present teachings provide a canister that is quick release and quick insert into the tonneau system. The present teachings provide a canister that is removable without using any tools. The present teachings provide a tonneau system that guides the canister into place and out of place so that the tracks of the canister and the roller tracks are moved into alignment and out of alignment so that tonneau cover may be extended and retracted. The present teachings provide a method of adding and removing a canister from a tonneau system without removal of any other components of the tonneau system.

BRIEF DESCRIPTION OF THE DRAWINGS

FIG. 5B is a side view of the canister moved so that the bearing moves from the guide lock to the movement pocket releasing the canister;

DETAILED DESCRIPTION

Figure 1A:
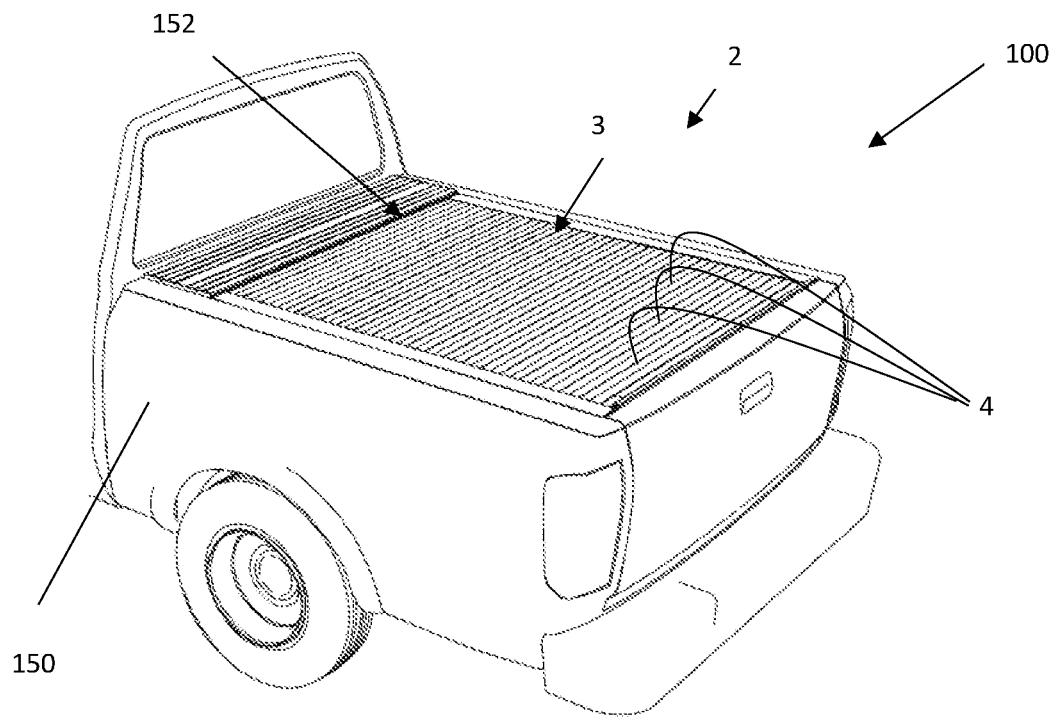
FIG. 1A is a perspective view of a vehicle with a tonneau system in a closed position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The tonneau system functions to cover an open area and prevent fluid, debris, dirt, or a combination thereof form entering the open area (e.g., a bed of a vehicle and preferably a pick-up truck, and hereinafter "bed"). The tonneau system may function to lock a bed so that items may be stored within the bed. The tonneau system may be collapsible so that items may be placed within the bed without interference from the tonneau system. The tonneau system may fold upon itself to expose the bed. Preferably, the tonneau cover may roll up or roll into a canister that stores the tonneau cover of the tonneau system. The tonneau system may include one or more tonneau sections and preferably a plurality of tonneau sections that are pivotably connected together to form a tonneau cover. The tonneau cover may be a plurality of tonneau sections that are connected together via one or more pivot pins so that the tonneau sections move relative to each other about an axis.

The tonneau sections (i.e., section) function to connect together to create one contiguous surface (e.g., a cover). The tonneau sections may lock together. The tonneau sections may be longitudinally movable, rotationally movable, or both relative to other tonneau sections. The tonneau sections when in a closed position may prevent fluid, debris, dirt, or a combination thereof from entering a bed. The tonneau sections may be separate pieces. The one or more tonneau sections may be connected together to extend within a first plane. The one or more tonneau sections may extend along a first plane when the tonneau sections are in a closed position. The one or more tonneau sections may extend from the first plane and into the canister when the tonneau sections are moved into the stored position. The tonneau sections may be connected together by a hinge, an outer covering, or both. The tonneau sections may be connected together by a cover that is flexible so that one tonneau section is movable relative to another tonneau section. The tonneau sections may be a plurality of sections that are flexible so that the tonneau sections may mirror the shape of the track. The tonneau sections may include one or more inner sections (e.g., that extend along track one), one or more outer sections (e.g., that extend along track two), one or more curved sections (e.g., that extend along track three), or a combination thereof. The one or more inner sections may be a plurality of sections. The inner sections may be a forward end of the tonneau cover and may extend into the canister first. The inner sections may extend into the canister first. The inner sections may be connected to one or more curved sections. The curved sections may change the tonneau cover from a first direction to a second direction. The curved sections may be flat in the closed position. The curved sections may be arcuate or bent in the stored position. The curved sections may assist the tonneau cover in confirming to the shape of the track. The tonneau cover may only be made of curved sections. The curved sections may be located between one or more inner sections and one or more outer sections. The one or more outer sections may be the last sections to extend into the canister. The one or more outer sections may remain partly out of the canister. Preferably, all of the tonneau sections extend into the canister. The one or more outer seconds may include a tab that extends out of the canister so that when the canister is in the installed position the tonneau cover can be removed from the canister. The one or more outer sections may connect to a tonneau cap, an end of a bed, a tailgate, or a combination thereof. The one or more outer sections may be a portion that a user grips to remove the tonneau cover from the canister. The tonneau sections when connected together may form a tonneau cover, which covers a bed of a vehicle. The tonneau sections may be connected together via an outer covering or may include an outer covering that assists in forming a contiguous surface when the tonneau cover is in the closed position.

The outer covering may be flexible so that one tonneau section may be moved relative to another tonneau section. The outer covering may prevent one tonneau section from being longitudinally moved relative to another tonneau section. The tonneau sections may include a frame member (e.g., including support arms, support brackets, mounting parts, tracks, rollers, or a combination thereof). The tonneau sections may include one or more frame members. The one or more frame members may extend along a length of each section, form a perimeter of the tonneau system, or both. The tonneau sections, outer covering, or both may be made of a sheet moulding compound. The tonneau sections, outer covering, or both may be made of a polymer, foam, metal, aluminum, titanium, or a combination thereof. The outer covering may have some elastomeric properties that allow one tonneau section to be longitudinally moved relative to another tonneau section. The outer covering may be a spacer that is located between each tonneau section and moves with each tonneau section. The outer covering may prevent water from penetrating between the tonneau sections in the closed position, extended position, stored position, or a combination thereof. The cover may extend over more than one tonneau section. The outer cover may extend from one end of a tonneau section to another end of a tonneau section so that a gap between the tonneau sections are covered. The tonneau sections may be free of an outer covering. The tonneau sections may be rotatable about a hinge pivot, movable along a roller track, a track, or a combination thereof by moving along one or more rollers.

The one or more rollers may function to move the tonneau cover or create a low friction interface for the tonneau cover to move between a closed position and a stored position.

Preferably, the rollers discussed herein are sets of opposing rollers. The one or more rollers may function to move the tonneau cover along one or more tracks. The rollers may be part of the cover. The rollers may be part of the track. Each section may have one or more rollers at a first end (e.g., passenger's side) and a second end (driver side). Each section may have a plurality of rollers at each end. The rollers may be located within a plane and may assist the tonneau cover in moving. The rollers may be circular and may create a low-friction surface that the tonneau cover slides along. The rollers may sit within a track, a roller track, or both that guides the tonneau cover. The rollers may be to flat surfaces that contact each other and allow the tonneau cover to move. The rollers may be a planar surface. For example, the rollers may be a surface inside of a track (that may be low friction) and the tonneau cover may have one or more flat surfaces that move along the surface inside of the track. The one or more rollers may be a bearing surface. The rollers may be a polymer, a plastic, poly, metal, graphite, or a combination thereof that slide along another surface. The rollers may allow for longitudinal movement and prevent lateral movement. The rollers may rotate. The rollers may slide without rotational movement. The rollers may include or be a bearing. The rollers may be free of a bearing. The rollers may be surfaces that the tonneau cover moves along. All of the rollers may be located within a single plane until the rollers enter into the canister where the rollers may be separated by a plurality of tracks located within the canister.

The one or more canisters may function to store the tonneau cover, one or more of the tonneau sections, or all of the tonneau sections when the tonneau cover is moved from a closed position to a stored position. The one or more canisters may be located below a top of the truck bed. The one or more canisters may extend into a truck bed, through a truck bed, or both. A top of the one or more canisters and a top of the tonneau cover may be substantially flush in the installed state. The one or more canisters may include a space that receives a tonneau cover. The space in the canister may store a tonneau cover. The tonneau cover may roll up in the space, fold within the space, roll up on a track, roll up upon itself, or a combination thereof. The space may be open. Preferably, the space is a closed space inside of the tonneau cover. The canister may be connected to the bed by one or more roller tracks, one or more rails, one or more rail extensions, or a combination thereof. The one or more canisters may be removably connected to the one or more roller tracks, one or more rails, one or more rail extensions, one or more canister locks, one or more bearings, or a combination thereof. The one or more canisters may be inserted in and removed from the tonneau system without adding or removing any other components of the tonneau system (e.g., rails, roller track, or both). The canister may be removed by removing a cap, actuating a one or more canister locks, or both. The canister may be connected to a roller track, a rail extension, or both on a first end (driver side) and a second end (passenger side). The one or more canisters may include one or more tracks. The one or more tracks in the canister may permit the tonneau sections to curve or bend within the canister so that the tonneau sections are stored and protected. The one or more canisters may angle the tonneau sections so that the tonneau sections are stored and are controllably moved into the canister. The one or more canisters may be connected to a bed, a forward wall of a bed, one or more side walls of a bed, or a combination thereof. The canister may store all or a portion of the tonneau cover and permit the canister and tonneau cover to be removed from the tonneau system. The canister may include one or more handles.

The one or more handles may function to assist in removal of the canister from the tonneau system. The one or more handles may be located on a front end, a rear end, or both ends of the canister. The handle may be located between the canister and the cab, between the canister and the tail gate, or both. The handle may be rigid, flexible, storable, a recess in the canister, connected to an outside of the canister, an absence of material, or a combination thereof. The one or more handles may assist in removing the canister from the bed, the guide lock, the bearing, or a combination thereof. The one or more handles may assist in moving the canister once the tonneau cover is stored on the one or more tracks.

The one or more tracks may maintain each of the tonneau sections spaced apart so that one tonneau section does not overlap and contact an adjacent tonneau section. The one or more tracks function to guide the tonneau cover into and out of the canister. The one or more tracks may prevent a first portion (e.g., an inner section) of a tonneau cover from contacting a second portion (e.g., an outer section) of a tonneau cover. The one or more tracks may assist in storing the tonneau cover. The one or more tracks may assist is slowing the tonneau cover as the tonneau cover extends into the canister. The one or more tracks may be or include a section that is generally circular, oval, "U" shaped, "C" shaped, or a combination thereof. The one or more tracks may have two portions that are parallel to each other. The one or more tracks may have two portions that are converging. For example, an inner track and an outer track may be angled such that the inner track and the outer track converge towards each other. The one or more tracks may have two portions that are diverging. The track may extend to the bed. The track may guide a portion of the tonneau cover parallel to the bed. The one or more tracks may have one or more segments. Preferably, the track has a plurality of segments that control movement of the tonneau cover within the canister. The track may be scroll shaped. The track may include one or more outer tracks, one or more inner tracks, one or more curved tracks, a track one, a track two, a track three, or a combination thereof. The one or more tracks may be located within a space within the canister.

The space within the canister may function to store the tonneau cover. The space may be an open area that the tonneau cover may fit within. The space may include a spring, an axis, a shaft, tracks, or a combination thereof that assist in storing the tonneau cover. The space may receive all or a portion of the tonneau cover when the tonneau cover is in the stored position, closed position, or both. The open space may have one or more shafts that extend from one end to another end (e.g., from a cover on a first end to a cover on a second end). The space may be free of any other components of the canister. The space may include one or more shafts, one or more springs, one or more tracks, or a combination thereof. The tracks of the canister may align with one or more roller tracks within each of the one or more rails.

The one or more rails function to connect to a bed of a vehicle, allow the tonneau cover to move between a closed position and a stored position, or both. The one or more rails may extend from a forward end of a bed to a rear end of a bed. The one or more rails may have a length substantially equal to a length of a bed. The one or more rails may connect a tonneau cover to a bed and a canister. A first rail may extend along a driver side and a second rail may extend along a passenger side of a bed. The rails may connect a first side of a tonneau cover to a first side of a bed and a second side of a tonneau cover to a second side of a bed. The rails may include one or more roller tracks that receive one or more rollers of the tonneau cover.

The one or more roller tracks may function to receive one or more rollers of the tonneau cover so that the one or more rollers are movable along the bed between a closed position and a stored position. The one or more roller tracks may be connected to a vehicle, a bed of a vehicle, or both. The one or more roller tracks may remain connected to a vehicle, a bed of a vehicle, or both when the canister is removed. The one or more roller tracks may be a channel, a groove, a recess, an aperture, or a combination thereof. The one or more roller tracks may be generally "C" shaped, generally "U" shaped, or both so that as a roller moves within a roller track the roller is maintained within the roller track and guides the tonneau cover. The one or more roller tracks may be a single roller track in each rail. The roller tracks may be parallel to a direction of movement of a tonneau cover so that the tonneau cover is movable into the canister and out of the canister. The roller track (e.g., rail) and track (e.g., canister) may be connected together by one or more rail extensions. The one or more roller tracks, tracks, rail extensions, or a combination thereof may be covered by one or more roller extensions.

The one or more roller extensions may function to extend outward to cover a connection location between the vehicle and the canister. The one or more roller extensions may be connected to the canister. The one or more roller extensions may be a unitary part of the rail. The rail may be one solid piece that includes the roller extension. The roller extension may extend in a first direction away from the roller track that extends in a second direction. The roller extension may extend away from an opposing side of a vehicle. For example, the roller extension may extend from a passenger side of a vehicle in a passenger side direction away from the driver side. The roller extension may extend a length of the bed. The roller extension may extend up to the canister and stop. The roller extension may be free of extending over the canister or a region proximate to the canister. The roller extension when located proximate to the cover cap, the cap, or both may form a contiguous surface that prevents water from entering the bed, the canister, the vehicle, or a combination thereof. The roller extension may include one or more fingers that assist in connecting the roller extension with the cap, the cover, or both.

The one or more roller fingers function to assist in connecting a cover, a cap, a projection connection, or a combination thereof within the tonneau system, with the rail, or both. The one or more roller fingers may create an open space, a roller recess or both. The roller fingers may oppose each other. The one or more roller fingers may extend towards each other. The one or more roller fingers may each be "C" shaped, "U" shaped, include one or more curves, or a combination thereof. The roller fingers may be two opposing fingers that curve towards each other to create an ovoid shape with an opening in the ovoid. The roller fingers may include one or more roller recesses or form one or more roller recesses. The one or more fingers may connect to or hold one or more projection connectors so that the cover, cap, rail, or a combination thereof of are connected together, held in place, or both.

The one or more roller recesses may function to connect the rail to a cover, a cap, or both. The one or more roller recesses may receive one or more projection connectors. The one or more roller recesses may face downward towards the roller track, away from the roller track, in a direction parallel to the roller track, or a combination thereof. The one or more roller recesses may be an open space. The one or more roller recesses may be formed between two or more roller fingers. The one or more roller recesses may be a gap in the roller extension between two or more roller fingers where a male member, a locking member, a projection connector, or a combination thereof may connect to the rail. The one or more roller recesses may form a complementary fit with one or more projection connectors. The one or more roller recesses may be a completely closed space (e.g., completely surrounded by roller fingers). The one or more roller recesses may be partially open (e.g., the roller fingers may not connect and may be separated). The one or more roller recesses may receive a projection connector to connect to the cover, the cap, or both and a rail connector may support the rail relative to a bed.

The rail connector may function to connect the rail to a bed, a clamp, or both. The rail connector may be in contact with a clamp and the clamp may hold the rail on a side wall of the bed. The rail connector may prevent a clamp from moving relative to a sidewall of a bed. The rail connector may be a plurality of raised surfaces, grooves, bumps, or a combination thereof. The rail connector may be in contact with or on an opposing side of one or more rail extensions.

The one or more rail extension function to connect a canister to a rail, connect a roller track to a track, connect a bearing within the tonneau system, connect a canister lock within the tonneau system, or a combination thereof. The one or more rail extensions may connect directly to a bed of a vehicle. The one or more rail extensions may connect only to a rail, only to a canister, or to both the rail and the canister. The one or more rail extensions may form a bridge or act as a bridge between the rail and the canister; between a roller track and a track; or both. The one or more rail extensions may extend parallel to the rails. The one or more rail extensions may be flat, planar, or both. The rail extension may be free of a direct connection with the rail, the canister, or both. The one or more rail extensions may be generally planar and may include a bearing, a canister lock, or both that extend from the rail extension. The rail extension may be a support for a bearing, a canister lock, or both. The rail extensions may be located on a first side, a second side, or both sides of a bed, a canister, or both. The tonneau system may include one rail extension. Preferably, the tonneau system includes a plurality or rail extensions. The rail extensions may connect a bearing, a canister lock, or both within a tonneau system. Each rail extension may include a bearing, a canister lock, or both. Preferably, each rail extension includes both a bearing and a canister lock. The rail extensions may function to add a bearing, a canister lock, or both into a tonneau system.

The one or more canister locks function to connect the canister to the rails, the rail extensions, the bed, or a combination thereof when the canister locks are in a locked state and to release the canister when the canister locks are in an unlocked state. The canister lock may receive a locking tab of the canister so that the canister lock prevents the canister from being removed when the canister locked in a locked state. The canister lock may be openable and closeable. The canister lock may only be openable when the tonneau cover is in the stored position. A canister lock on a first side may be connected to a canister lock on a second side. A chord, string, connection member, or a combination thereof may connect two canister locks together so that both canister locks may be actuated substantially simultaneously. The one or more canister locks may be connected to a rail extension. The one or more canister locks may connect the canister to the rail extension so that the canister is prevented from being removed from the tonneau system. The one or more canister locks may connect the canister to a rail, a rail extension, the bed, or a combination hereof so that the canister is prevented from being removed. The one or more canister locks may include a release arm that may be connected to a locking jaw.

The one or more release arms may function to release a canister from the bed, the rail, the rail extension, a locking tab, or a combination thereof. The one or more release arms may move a locking jaw. The one or more release arms may open and close a locking jaw. The one or more release arms may actuate the locking jaw so that a canister may be moved relative to the canister lock. The one or more release arms may rotate about a pivot. The one or more release arms may extend cantilever from the canister lock. The one or more release arms may extend towards a bed of a vehicle. The one or more release arms may be located inside of the tonneau system, under a tonneau cover, or both. The one or more release arms may be connected to or in communication with one or more locking jaws so that when the release arms are moved from a first position to a second position the locking jaws are moved from a first position to a second position. The one or more release arms may move between a locking position and an unlocking position so that the locking jaw is moved from a locking position to an unlocking position.

The one or more locking jaws function to connect the canister lock to the canister so that the canister is retained within the tonneau system. The one or more locking jaws may open so that a portion (e.g., locking tab) is movable out of the canister lock. The one or more locking jaws may move in a first direction regardless of the position of the release arms. The one or more locking jaws may actuate the release arms when a locking tab is moved into the canister lock as the canister is moved from the removed position to the locked position. The one or more locking jaws may only be movable in a second direction when the release arm is in an unlocked state. The one or more locking jaws may prevent movement of the canister from a locked position to a removed position except when the locking jaws are unlocked by the one or more release arms being actuated. The one or more locking jaws may receive a locking tab and may assist in aligning a bearing of the rail extension with a track guide of a canister. A locking jaw on a first side may be connected to a locking jaw on a second side so that when the locking jaw on the first side is actuated, the locking jaw on the second side is actuated. For example, a cable, wire, string, rod, or a combination thereof may connect the locking jaw on the first side to the locking jaw on the second side. The one or more locking jaws may receive one or more locking tabs.

The one or more locking tabs may function to connect the canister within the tonneau system, to the bed, to the rail extension, to a rail, or a combination thereof. The one or more locking tabs may extend into a locking jaw when the canister is in the locked position. The one or more locking tabs may be a pin, a bearing, a projection, a male feature, or a combination thereof that extends into the locking jaws to prevent movement of the canister. The one or more locking tabs may be a striker latch. The one or more locking tabs may be static and the canister lock may be forced into contact with the locking tab to form a fixed connection. The one or more locking tabs may be connected to the vehicle to prevent movement of and/or removal of the canister. The one or more locking tabs may be a bearing as discussed herein.

The one or more bearings may function to assist a canister in being removed, being installed, or both. The one or more bearings may assist in preventing movement of the canister when the canister is in the locked position. The one or more bearings may guide the canister, the guide track, or both into a predetermined position (e.g., locked or unlocked). The one or more bearings may be static and may assist in guiding the canister between and installed position and a removed position. The one or more bearings may be connected to the rail extension, the rail, or both. The one or more bearings may be formed with the rail, rail extension, or both and extend from the rail, rail extension, or both. The one or more bearings may be connected to the one or more guide tracks or located within the one or more guide tracks. The one or more bearings may assist in connecting the canister to the bed of a vehicle. The one or more bearings may extend cantilever from the rail, the rail extension, or both. The one or more bearings may be generally circular, oval, square, triangular, symmetric, asymmetric, or a combination thereof. The one or more bearings may be metal, plastic, extend into a hold, lock in place, be a striker, be free of rotation, be a busing, a shoulder bolt, bolt, stud, molded part, projection, or a combination thereof. The bearing may slide. The bearing may rotate. The bearing may prevent movement of the canister. The bearing may be free of rotation. The one or more bearings may be a single bearing. The one or more bearings may be one or more bearings on each side of a bed. The one or more bearings may be a plurality of bearings on each side of the bed. The one or more bearings may guide the canister from a locked position to a removed position, from a removed position to a locked position, or both. The one or more bearings may extend into a track guide, along a side of a track guide, on one or more sides of a track guide, both sides of a track guide, or a combination thereof. Preferably, the one or more bearings extend into a track guide located on a cover of the canister that assists the canister in being removed.

The one or more covers may function to seal sides of the canister, prevent the tonneau sections from being contaminated when the tonneau sections are located within the canister, or both. The one or more covers may be an integral part of the canister. The one or more covers may be removable. The one or more covers may snap on, be fastened on, or both. The one or more canister covers may be located on a side, a front, a back, a bottom, or a combination thereof. The one or more canister covers may be sufficiently strong so that the canister, the canister and tonneau cover, or both may be supported only by the canister covers. The canister covers may support a weight of about 15 Kg or more, about 25 Kg or more, about 35 Kg or more, about 50 Kg or more, about 200 Kg or less, or about 100 Kg or less. The one or more canister covers may be made of metal, aluminum, titanium, steel, a polymer, a thermoset, or a combination thereof. The one or more covers may include one or more apertures, one or more tracks, or both. The one or more covers may include one or more track guides. Each of the covers may include a track guide. A track guide and a cover may be located on each side of the canister.

The cover cap may function to extend from the cover towards the tonneau cover, under the cap, under the rail, or a combination thereof. The cover cap may prevent water from extending between the cover and a side of the vehicle. The cover cap may extend away from a side wall of a vehicle, towards an opposing side wall of a vehicle, or both. The cover cap may be generally "L" shaped, generally "C" shaped, generally "U" shaped, or a combination thereof. The cover cap may create a barrier between the cap and the rail, the tonneau cover, or both. The cover cap may have a portion that extends in a first direction towards a center of a vehicle bed and a cover extension that extends in a second direction away form a center of a vehicle bed.

The cover extension may function to prevent fluid from extending into the vehicle bed, through the tonneau cover, through the tonneau system, between the rail and the tonneau cover, between the rail and the bed of the vehicle, or a combination thereof. The cover extension may create a connection with a cap, a rail, or both. The cover extension may guide fluid away from the tonneau cover. The cover extension may lock on to the cover. The cover extension may extend into an extension clip. The cover extension and extension clip may connect together so that one side of cap is locked to the cover. The cover extension may assist in locking the cover to the tonneau system. The cover extension may extend cantilever from the cover. The cover extension may be one part of clip that attaches the cover to the tonneau system. The cover extension, cover cap clip, cover finger, or a combination thereof may work together to connect a cap, the rail, or both within the tonneau system.

The one or more cover cap clip may function to connect the cover to the rail, the cap, a projection connector, or a combination thereof. One or more cover cap clips may be connected to each side of the canister. A plurality of cover cap clips may be connected to each side of the canister. The cover cap clip may form one side of a cover receptacle. The cover cap clip may assist in connecting the cap to the canister. The cover cap clip may connect to a first side of a projection connector and the cap my connect to a second side of the projection connector. The cover cap clip and a cover finger may form a cover receptacle therebetween. The cover cap clip and the cover finger may be substantially identical. The cover cap clip may be longer than a cover finger. The cover finger may be longer than the cover cap clip. The cover cap clip and the cover finger may be substantially the same length. The cover cap clips may include one or more steps. The one or more steps may be complementary in shape to a step in the secondary cap clip. The one or more steps may lock the cover and the cap together. The one or more steps may lock the cover cap clip to the steps in the secondary cap clip so that the cover and the cap are connected together on side of the cover receptacle.

The one or more cover receptacles may function receive one or more projection connectors so that the one or more covers, one or more caps, one or more rails, or a combination thereof are connected together. The one or more cover receptacles may oppose a one or more cap receptacles. The one or more cap receptacles and the one or more cover receptacles may assist in connecting one or more caps within the tonneau system, to the canister, or both. The one or more cap receptacles may be generally "U" shaped or generally "C" shaped. The one or more cap receptacles may form a portion of a recess. The one or more cap receptacles may be formed between a cover cap clip and a cover finger.

The one or more cover fingers may function to connect the cover to a cap, a rail, a projection connector, or a combination thereof. The one or more cover fingers may be substantially identical to the one or more cover cap clips. The one or more cover fingers may form a projection below a cap receptacle. The one or more cover fingers may be generally straight, include one or more curved sections, one or more locking features, or a combination thereof. The one or more cover fingers may extend over the canister, the rail, the track guides, or a combination thereof.

The one or more track guides may function to guide the canister in and out of the tonneau system. The one or more track guides may facilitate movement of the canister without removal of any other components of the tonneau system. For example, the canister may be removed from the rails, the rail extension, or both while the rails, the rail extensions, or both remain connected within the bed. The one or more track guides may include one or more holes. The one or more track guides may only allow movement of a bearing within the track guide in a single direction. The one or more track guides may only allow the canister to move vertically or horizontally. Preferably, if the track guides only allow movement in one direction the movement is vertically. The track guides may guide movement of the canister in two or more directions. Preferably, the track guides guide the canister in a horizontal direction and a vertical direction. The bearing when moving through the track guide may move in an "L" shape. The one or more track guides may have a symmetrical shape. Preferably, the track guides have an asymmetrical shape. The one or more track guides may be generally "R" shaped, generally "P" shaped, generally "L" shaped, generally "T" shaped, include one or more terminal ends, include one or more ends that the bearing drops into, one or more detents, or a combination thereof. The one or more track guides may funnel a bearing towards a locked position where the canister may be connected to the rails, the tonneau system, or both. The one or more track guides may include a tortuous path so that the bearing cannot be inadvertently removed or guided through the one or more track guides. The one or more track guides may include one or more guide locks, one or more movement pockets, one or more guide necks, one or more track legs, one or more track openings, or a combination thereof.

The one or more guide locks may prevent the canister from moving vertically, being removed from the bed, being removed from the tonneau system, being removed from the rails, or a combination thereof. The one or more guide locks may receive one or more bearings. The one or more guide locks may be a terminal end of the one or more track guides. The one or more track guides when in communication with the bearing may ensure that the canister is properly seated within the bed. The one or more guide locks may prevent the canister from being rotated, lifted, moved towards a passenger compartment, away from a passenger compartment, or a combination thereof. The one or more guide locks may prevent movement of the canister in every direction except for a direction that moves the bearing from the guide lock into the movement pocket.

The movement pocket may function to permit rotational movement, vertical movement, movement away from the canister lock, or a combination thereof. The movement pocket may function to receive the bearing when the canister is moved in a first direction. The movement pocket may receive the bearing when the canister is moved away from the guide lock, a terminal end of the guide lock, or both. The movement pocket receives the bearing from a guide neck when the canister is being installed and when the bearing contacts the movement pocket vertical movement may be prevented. The movement pocket may permit movement of the canister in one vertical direction, one horizontal direction, or both. The movement pocket may restrict movement of the canister towards the end of the bed opposite the passenger compartment. The movement pocket may permit a change is movement from a first direction to a second direction as the canister moves. The first direction and second direction may be separated by an angle of less than 180 degrees and more than 0 degrees. The first direction and the second direction may be separated by an angle of about 45 degrees or more and about 135 degrees or less. Preferably, the first direction and the second direction are substantially perpendicular to each other (e.g., vary by an angle of ±5 degrees, ±3 degrees, or preferably ±1 degree). The bearing may move from the guide lock to the movement pocket and then to guide neck as the canister is being removed from the bed.

The guide neck functions to facilitate movement of the canister in a direction away from a bottom of the bed (e.g., vertically), a direction towards a bottom of the bed, or both. The guide neck may maintain alignment of the canister with the bed, the rails, the rail extensions, the bearings, or a combination thereof as the canister is inserted into or removed from the bed. The guide neck may restrain horizontal movements (e.g., movement parallel to the rails) of the canister so that the canister is guided out of the bed. The guide neck may have a width that is substantially uniform along a length of the guide neck. The guide neck may vary in width along the length of the guide neck. The guide neck may be formed by two or more track legs. The two or more track legs may converge towards each other, forming a guide neck, so that the guide neck restrains movement of the bearings, the canister, or both.

The one or more track legs function to restrain the bearing so that the canister is removed or installed in a predetermined fashion. The one or more track legs may create sides of the track guide. The one or more track legs may form the shape of the track guide. The one or more track legs may be one continuous track leg. The one or more track legs may be made of or include metal, plastic, a polymer, a coating, stainless steel, iron, titanium, nylon, or a combination thereof. The one or more track legs may include a coating. The coating may reduce friction. The coating may be polytetrafluoroethylene, anodized, or both. The one or more track legs may include two terminal ends. The one or more track legs may have depth or height where the bearings cannot be removed from the track guide without extending through a track opening.

The one or more track openings may function to release a canister from the bearings, the rails, the tonneau system, or a combination thereof. The one or more track openings may function to assist a canister in being connected to rails, rail extensions, the tonneau system, or a combination thereof. The one or more track openings may release a bearing from the track guide, accept a bearing, or both. The track opening may be a space between two terminal ends of a track leg or an opening between two track legs. The one or more track openings may flare out to guide a bearing into the track guide, the guide neck, or both. The one or more track openings may be a space between track legs. The one or more track openings may face downward, toward a bottom of a bed, or both. The one or more track openings, track guides, or both may be located under a cap.

The one or more caps function to prevent fluid from passing into the bed. The one or more caps function to remove fluid from an upper surface or an outer surface of the tonneau cover, the tonneau system, or both. The one or more caps may cover a gap between the canister and the rail, the rail extension, or both. The one or more caps may extend over the one or more roller tracks, the one or more rail extensions, or both. The one or more caps may form a seal between the bed of a vehicle and the canister when the canister is in the locked position. The one or more caps may lock to the canister, be removable, lock to the rail, lock to the rail extension, or a combination thereof. The one or more caps may be movable, removable, rotatable, slidable, or a combination thereof. The one or more caps may move out of place as the canister is removed. The one or more caps may be removed with the canister. The one or more caps may be an extension of the rails that extends over the canister and prevents fluid from entering the bed. The one or more caps may be independently added or removed when the canister is added or removed. The one or more caps may include one or more cap extensions, one or more cap locks, or both.

The one or more cap extensions function to extend away from a canister and over a gap between the canister and the bed, the rail, the rail extension, or a combination thereof. The one or more cap extensions may extend to be flush with a side of a bed, a side of a rail, a side of a vehicle, or a combination thereof. The one or more cap extensions may extend cantilever away from an extension clip, the canister, a cap lock, or a combination thereof. The one or more cap extensions may create a cover over the gap. The one or more cap extensions may be free of any locking features, clips, or both. The one or more cap extensions may create a cover over a gap. The one or more cap extensions may be connected to a cap lock that retains the cap in place.

The one or more cap locks may function to connect the cap to the canister, rail, roller track, bed, or a combination thereof. The one or more cap locks may prevent movement of the cap relative to the canister, rail, roller track, beck, or a combination thereof. The one or more cap locks may assist the cap in being removed when the canister is removed so that the cap does not have to be separately moved. The one or more cap locks may prevent lateral movement, longitudinal movement, rotational movement, or a combination thereof of the cap. The one or more cap locks may align the cap extension with the rail, the canister, the bed, or a combination thereof. The one or more cap locks may include one or more clips that lock the cap in a locked position. The one or more cap locks may include an extension clip, a primary cap clip, a secondary cap clip, or a combination thereof.

The one or more extension clips function to support the cap extension as the cap extension extends away from the cap lock. The one or more extension clips may connect to the cover extension, receive all or a portion of the cover extension, or both. The one or more extension clips may extend from a cap extension. The one or more extension clips may extend outward so that a recess is formed between the extension clip and the cover extension. The one or more extension clips may be a projection that extends into a component of the cover, under a component of the cover, or both (e.g., cover extension). The one or more extension clips may extend from an outer edge of tonneau system towards a center of the tonneau system. The one or more extension clips may assist in preventing water from entering between the cover and the rail, into a bed of a vehicle, or both. The extension clip may hold down one end of the cap and a primary cap clip, secondary cap clip, or both may hold down or connect a second end of the cap.

The primary cap clip, the secondary cap clip, or both function to connect the cap to the cover, the rail, the projection connector, or both. The primary cap clip, the secondary cap clip, or both may curve backwards towards the cap extension, extension clip, away from a middle of the tonneau cover, towards an edge of the tonneau cover, towards a rail, or a combination thereof. The primary cap clip, the secondary cap clip, or both may directly connect or indirectly connect to the cover, a cover extension, a cover cap clip, projection connector, or a combination thereof. The primary cap clip may be located below the secondary cap clip when the cap is in the installed position. The primary cap clip may be larger than the secondary cap clip or vice versa. The primary cap clip may be longer than the secondary cap clip. The primary cap clip may be wider than the secondary cap clip. The primary cap clip, the secondary cap clip, or both may be "C" shaped, "U" shaped, "J" shaped, or a combination thereof. The primary cap clip and the secondary cap clip may be parallel. A cap receptacle may be formed between the primary cap clip and the secondary cap clip.

The one or more cap receptacles may function to connect an end of the cap to the rail, the cover, a projection connector, or a combination thereof. The one or more cap receptacles may function to fix the cap to the cover, the rail, the canister, or a combination thereof. The cap receptacles may receive a projection connector that assists in locking the cap to a cover. The cap receptacles may be sufficiently large to connect to a projection connector. The cap receptacles may have a length that extends parallel to the rail. The cap receptacles may be located at ends of the canister and may connect to projection connectors at the ends of the canister. The projection connector and the cap receptacles may have a length that are substantially similar. The cap receptacles, cover receptacle, or both may form a friction fit with the projection connector, lock to the projection connector, or both.

The projection connector may function to connect or lock two or more components of the tonneau system together. The projection connector may connect the cap to a cover. The projection connector may extend parallel to the rail and may connect the cover to the cap. The projection connector may have a length that extends from a forward end of the canister to a rear end of the canister. For example, the projection connector may extend from an end of the canister by the cab of a vehicle to an end of the canister by the tailgate of a vehicle. The projection connector may have a shape so that projection connector when located within the cover receptacle, the cap receptacle, or both the projection connector connects the cap and the cover together. The projection connector may have a cross-section that is square, rectangular, diamond, pentagonal, hexagonal, diamond, or a combination thereof. The projection connector may be free of a fixed connection with any of the tonneau system until the projection connector is inserted into the tonneau system. For example, the projection connector may be a bar that is extended into the cover receptacle, the cap receptacle, or both to connect the cover and the cap together. The projection connector may be connected to the cover, the cap, the rail, or a combination thereof and then a portion of the projection connector may extend between the cap and the cover to form a connection. The projection connector may lock the cover and the cap together so that when the canister is moved between the various positions (e.g., locked, removed, closed, stored) the cap is connected to the canister and is removable and/or insertable into or out of the tonneau system.

The canister in the locked position is connected to the rails, the vehicle, or both. The canister in the locked position may be maintained in the tonneau system by a canister lock, a bearing, a track guide, or a combination thereof. In the locked position, the bearing may be located in the guide lock of the track guide. In the locked position, the canister may be prevented from being lifted vertically. In the locked position, the canister may be only movable in one direction. When the canister lock is released the canister may be moved from a locked position to a removed position.

The removed position may be a position where the bearing is moved from the guide lock to the movement pocket. The removed position may be where the canister is longitudinally moved along the rail so that that bearing is moved from the guide lock. The removed position may be where the bearing is aligned with the guide neck, track opening, or both. The removed position may permit the canister to be vertically lifted. The removed position may be where the canister is released from the canister lock and the canister is slideable along the rails. Preferably, the removed position is where the canister is completely removed from the tonneau system, the vehicle, the bed, or a combination thereof. The removed position may be where the canister is released and lifted out of the bed. The removed position may have the tonneau cover in the stored position so that the tonneau cover and the canister are removed from the bed, the tonneau system, or both.

The stored position may be where the tonneau cover is retracted into the canister. The closed position may be where the tonneau cover is extended from the canister. The stored position may be where substantially all of the tonneau cover is moved into the canister. In the stored position, two or less, one or less, or none of the tonneau sections may extend out of the canister. In the closed position, the bed may be completely covered by the tonneau cover. In the closed position, the bed of a vehicle may be locked, prevent fluids from entering therein, or both.

The vehicle as discussed herein may be any vehicle that has an open area that may be covered. The open area, preferably, is a bed. The vehicle may be a truck, a trailer, el camino, a UTV, ranchero, or a combination thereof. The bed of the vehicle may be an open area for storing items. The bed may be 1 m or longer, 1.5 m or longer, or 2 m or longer. The bed may be covered, uncovered, opened by removal of a canister, closed by insertion of a canister, or a combination thereof.

The steps of the method discussed herein may not be discussed in order and the steps discussed herein may be performed in a different order than discussed herein unless expressly discussed. The canister may be inserted into the tonneau system. A track opening may be aligned with a bearing. The canister may be lowered so that the bearing extends through the guide lock, the guide neck, between the track legs, through the track opening, or a combination thereof. The canister may be lowered so that the bearing is located in the movement pocket. The canister may be slid so that the bearing moves from the movement pocket to the guide lock. The canister lock may connect to a locking tab. The canister may be slid so that the locking tab extends into the canister lock to form a connection. The canister may be tipped so that one end contacts a rail and then a second end is moved into contact with a rail. The canister may automatically lock when the bearing is moved into the guide lock. The canister lock may be actuated to lock the locking tab and the canister lock together. The canister lock may be actuated to release the locking tab. The two or more canister locks may be connected together and actuation of one canister lock may actuate the other canister locks. A chord, wire, or some other device may extend between and connect the canister locks together. The chord, wire, or come other device may be actuated to release the canister locks. The canister locks may be actuated and the canister may be released so that the canister is movable. The canister may be slid along the rails so that the bearing moves from the guide lock to the movement pocket (e.g., in a first direction). The bearing may be aligned with the guide neck, the track opening, or both. One side of the canister may be tipped up (e.g., in a second direction). The canister may rotate about one side of the canister (e.g., front end or rear end). The entire canister may be vertically lifted (e.g., in a third direction). The canister may be lifted by a handle. The canister may be lifted from a center section. The canister when removed may remove the cover, the cap, the tonneau cover, or a combination thereof. The bearing may be moved between or along the track legs. The bearing may remain connected to the rails. The track guide may remain connected to the canister. The locking tab may be pushed into the canister lock or the canister lock may be pushed into contact with the locking tab so that a locked connection may be formed.

FIG. 1A illustrates a tonneau system 2. The tonneau system 2 includes a tonneau cover 3 made up of a plurality of tonneau sections 4. The tonneau system 2 in a closed position 100 so that the bed 152 of a vehicle 152 is fully covered. The canister 20 includes a space 24 within the canister 20 that receives the tonneau cover 3.

Figure 1B:
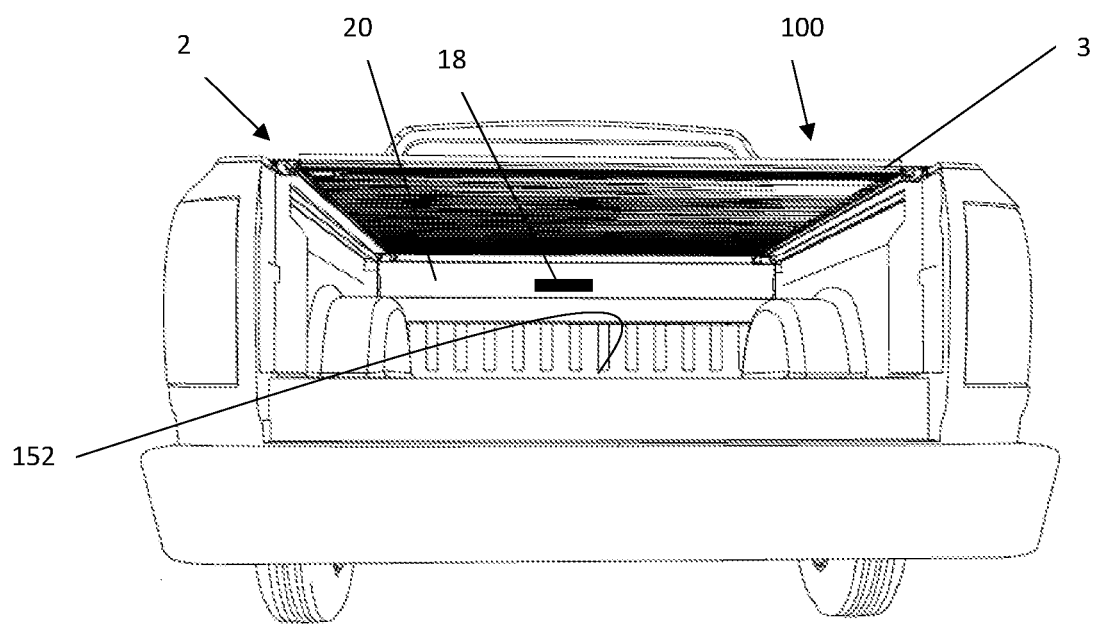
FIG. 1B is a rear perspective view of a vehicle with a tonneau system in a closed position.

FIG. 1B illustrates a view under the cover 3 of the tonneau system 2 when the bed 152 is covered. A canister 20 is located under the tonneau cover 3 and connected to the bed 152 so that when the tonneau cover 3 is moved from the closed position 100 to a stored position (not shown) the cover 3 is completely housed within the canister 20. The canister 20 includes a handle 18 that assists in removable of the canister 20 from the bed 152.

Figure 2:
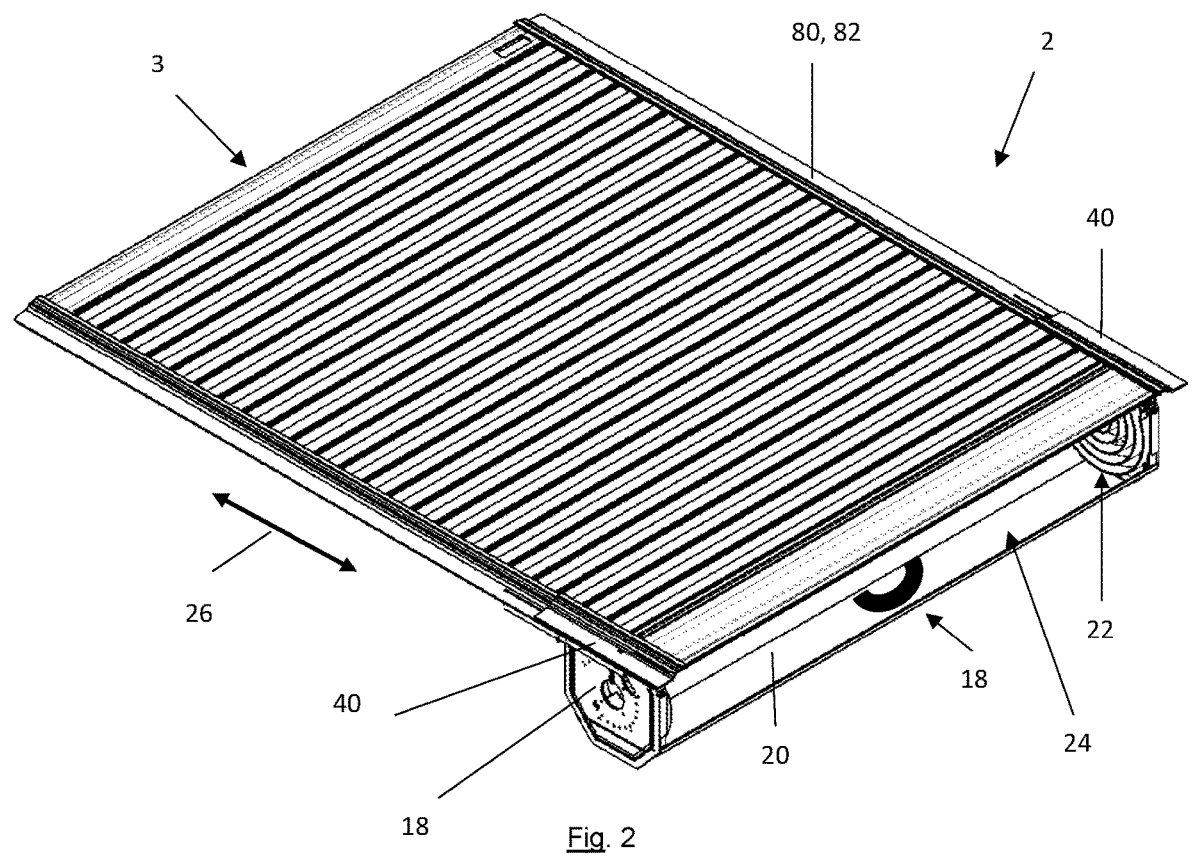
FIG. 2 is a front perspective view of a tonneau system in a closed position.
Figure 3:
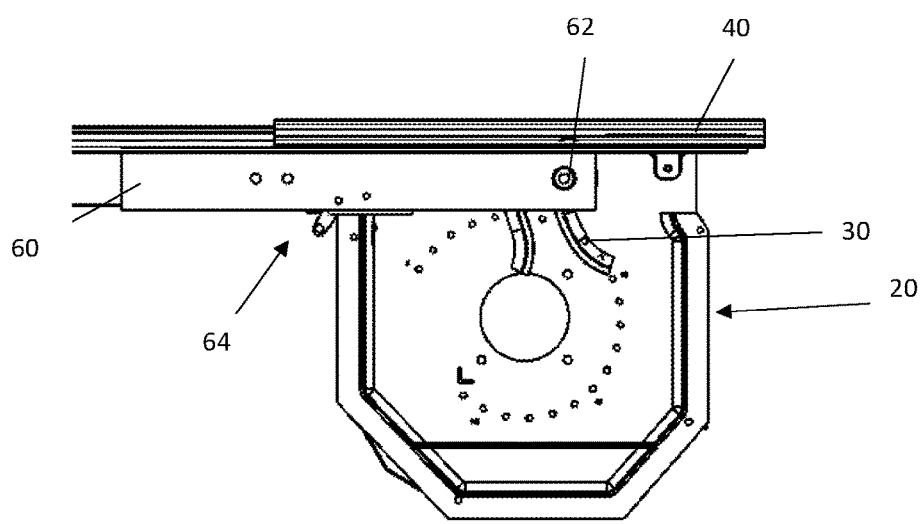
FIG. 3 is a side view of a canister.

FIG. 2 is a perspective view of a tonneau system 2 with a tonneau cover 2 connected to the bed via rails 80. Each of the rails 80 include a roller track 82. The tonneau cover 3 is connected to a roller track 82 that guides the tonneau cover 2 into or out of the tracks 22 located within the canister 20 as the tonneau cover moves in the direction 26. A cover 18 covers each end of the canister 20 and a cap 40 extends over a top of the canister 20. The canister 20 includes a handle 18 that assists in removal of the canister 20. As FIG. 3 is an end view of a canister 20. The canister 20 includes a track guide 30 that receives a bearing 62 connected to a rail extension 60. The rail extension 60 is at least partially covered by a cap 40 and is connected to canister lock.64.

Figure 4:
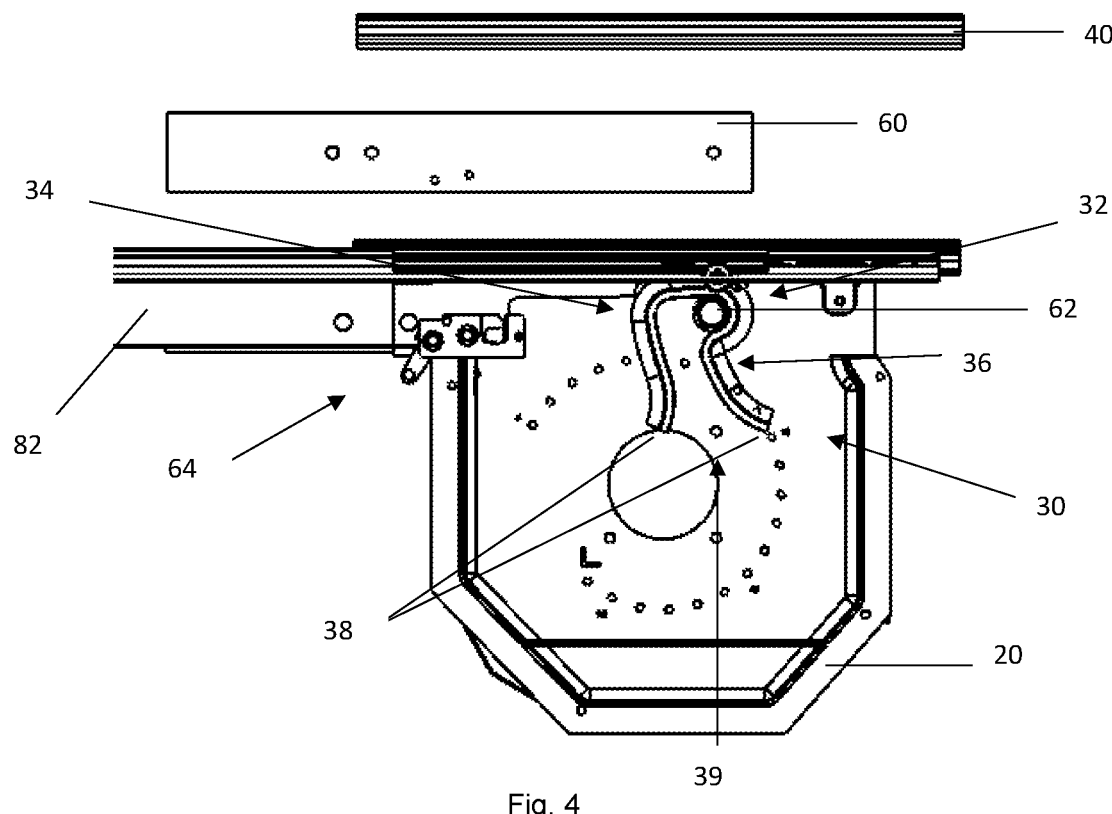
FIG. 4 is an exploded view of a canister and connection componentry.

FIG. 4 is a partially exploded view of a canister 20. The cap 40 and the rail extension 60 are removed from the canister 20 exposing the roller track 82, canister lock 64, bearing 62, and track guide 30. The track guide 30 guides the canister 20 along the bearing 62 so that the canister 20 is removable and insertable into a bed (not shown). The track guide 30 includes a guide lock 32, movement pocket 34, guide neck 36, track legs 38 and a track opening 39 located between the track legs 38.

Figure 5A:
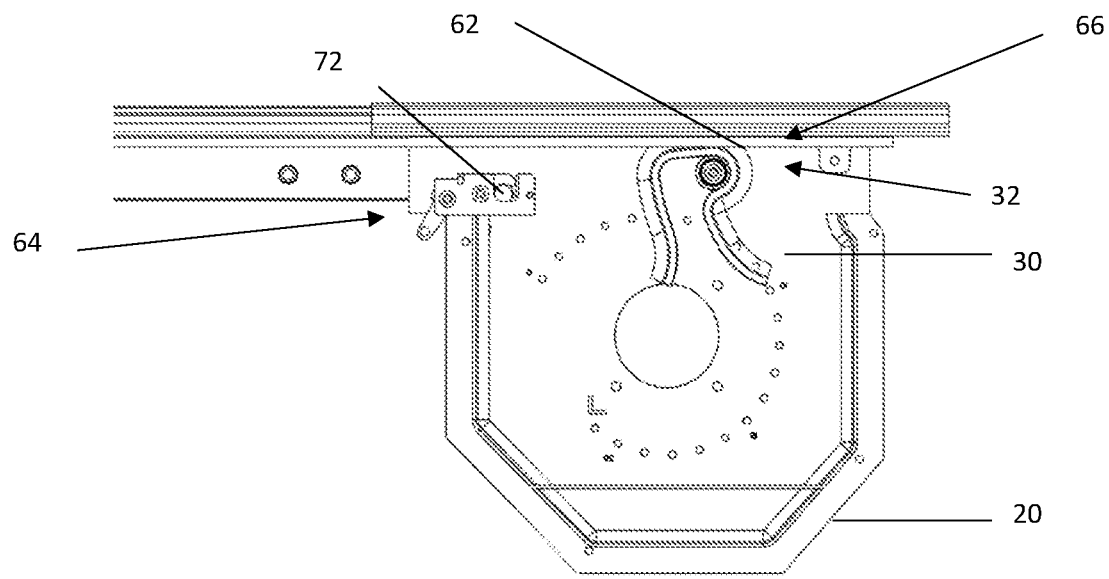
FIG. 5A is a side view of the canister in a locked position with the cap and rail extension removed.

FIG. 5A illustrates the canister 20 in the locked position 66 where the bearing 62 is located within the guide lock 32 of the track guide 30. The bearing 62 prevents the canister from being removed from a bed (not shown) by contacting the guide lock 32. As shown, the canister 20 includes a canister lock 54 that is locked in place by connecting to a locking tab 72.

FIG. 5B illustrates the canister 20 moving from the locked position 66 by the canister 20 being moved in the direction 26. When the canister 20 is moved in the direction 26 the bearing 62 is moved from the guide lock 32 to the movement pocket 34 of the track guide 30.

Figure 5C:
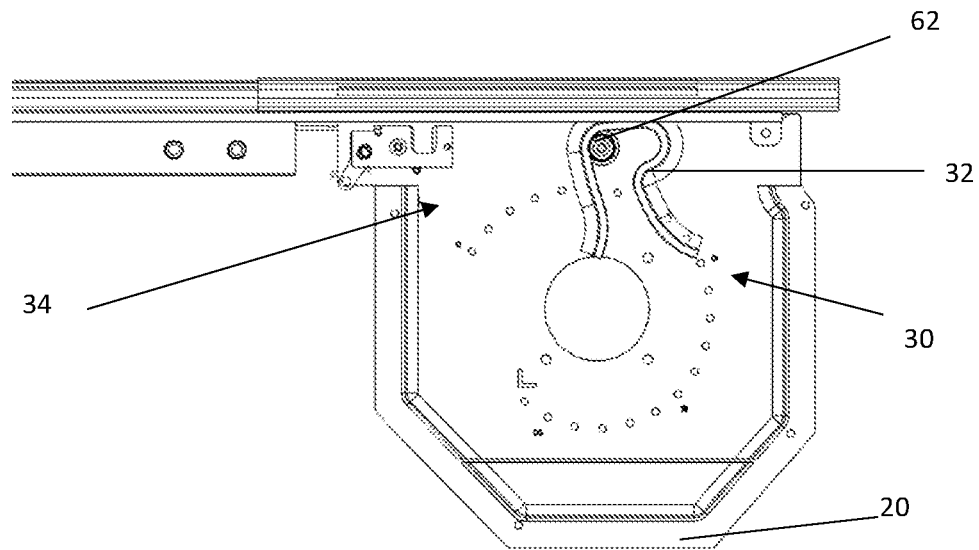
FIG. 5C is a side view illustrating the bearing moving through the guide neck as the canister is removed from the tonneau system.
Figure 5C:
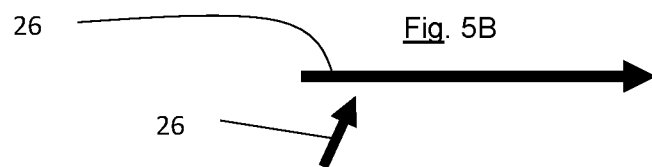
Figure 5C:
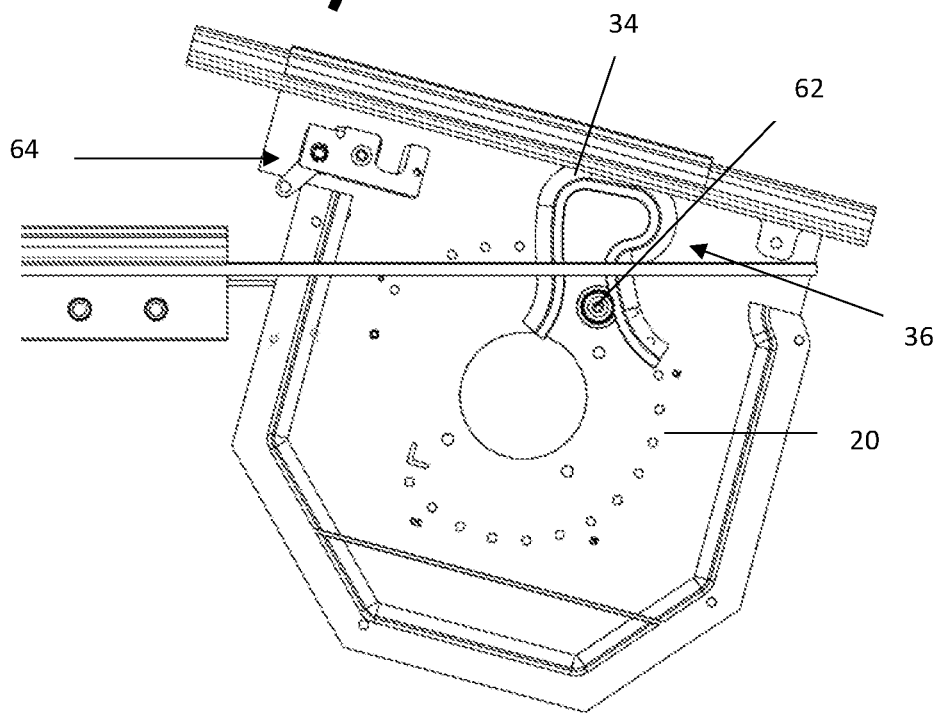

FIG. 5C illustrates the canister 20 being rotated so that one side of the canister 20 moves the in the direction 26. As a side of the canister 20 moves in the direction 26, the bearing 62 moves from a movement pocket 34 to a guide neck 36. The canister lock 64 is connected to the canister 20 and the canister lock 64 is removed with the canister 20.

Figure 5D:
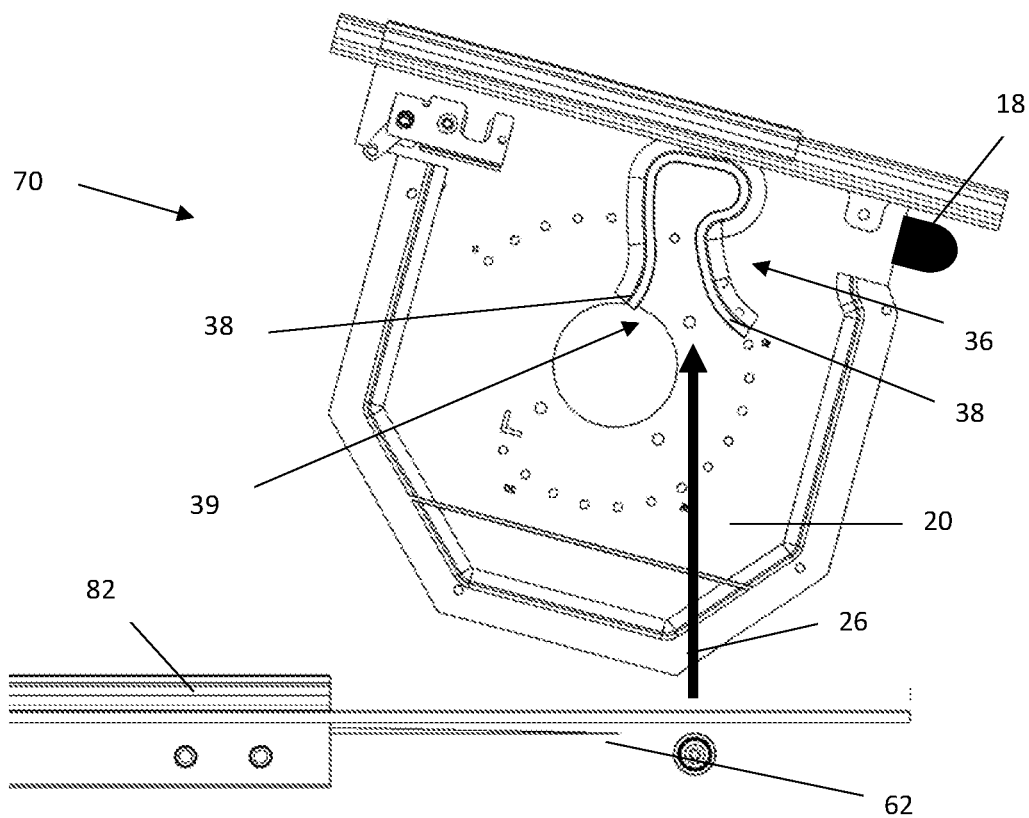
FIG. 5D is a side view of the canister being removed while the remaining tonneau system components remain connected to the bed of the vehicle.

FIG. 5D illustrates the canister 20 being removed from the roller track 82 and the bed (not shown). As the canister 20 is being lifted in the direction 26, the bearing 62 moves from the guide neck 36 between the track legs 38 through the track opening 39 so that the canister 20 is no longer connected. The canister 20 includes a handle 18 to assist in lifting the canister 20. As shown the canister 20 is in the removed position 70 where the canister 20 is not connected to the roller track 82 or the bearing 62.

Figure 6:
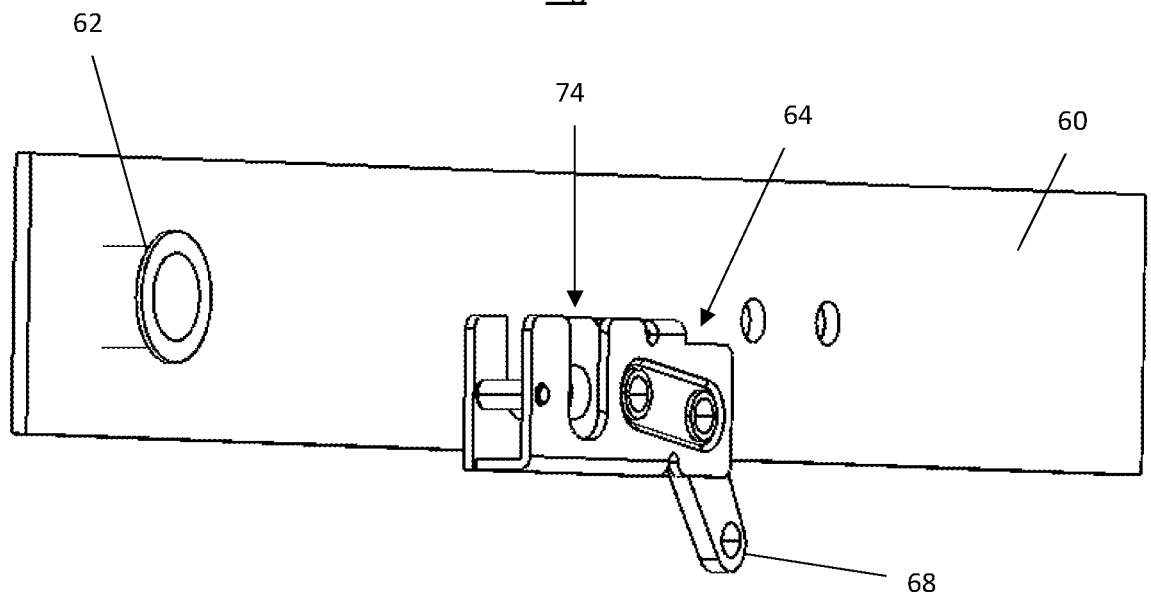
FIG. 6 is a perspective view of a rail extension including a bearing and a canister lock.

FIG. 6 is a perspective view of a rail extension 60 that includes a bearing 62 and a canister lock 64. The canister lock 64 incudes a release arm 68 that unlocks the canister (not shown) so that the canister can be removed and a locking jaw 74 that receives a locking tab (not shown) to create a locked state.

Figure 7:
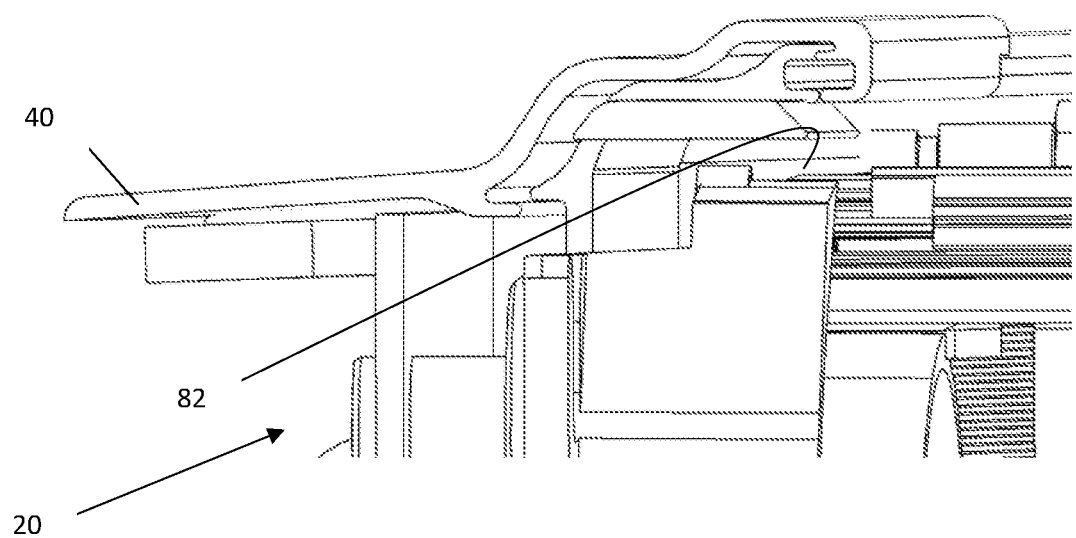
FIG. 7 is a perspective view of a cap extending over an edge of the canister.

FIG. 7 shows a cap 40 extending over the roller track 82 so that the cap prevents fluids from entering the canister 20.

Figure 8:
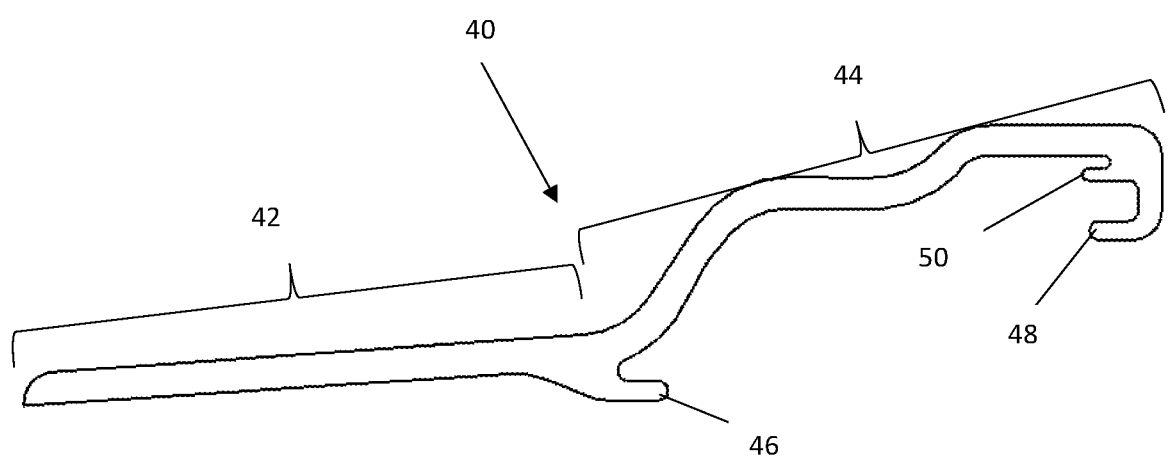
FIG. 8 is a plan view of a cap.

FIG. 8 illustrates a side view of a cap 40 including a cap extension 42 and a cap lock 44. An extension clip 46 is located between the cap extension 42 and the cap lock 44. The cap lock 44 includes a primary cap clip 48 and a secondary cap clip 50 that assist in connecting the cap within the tonneau system (not shown).

Figure 9:
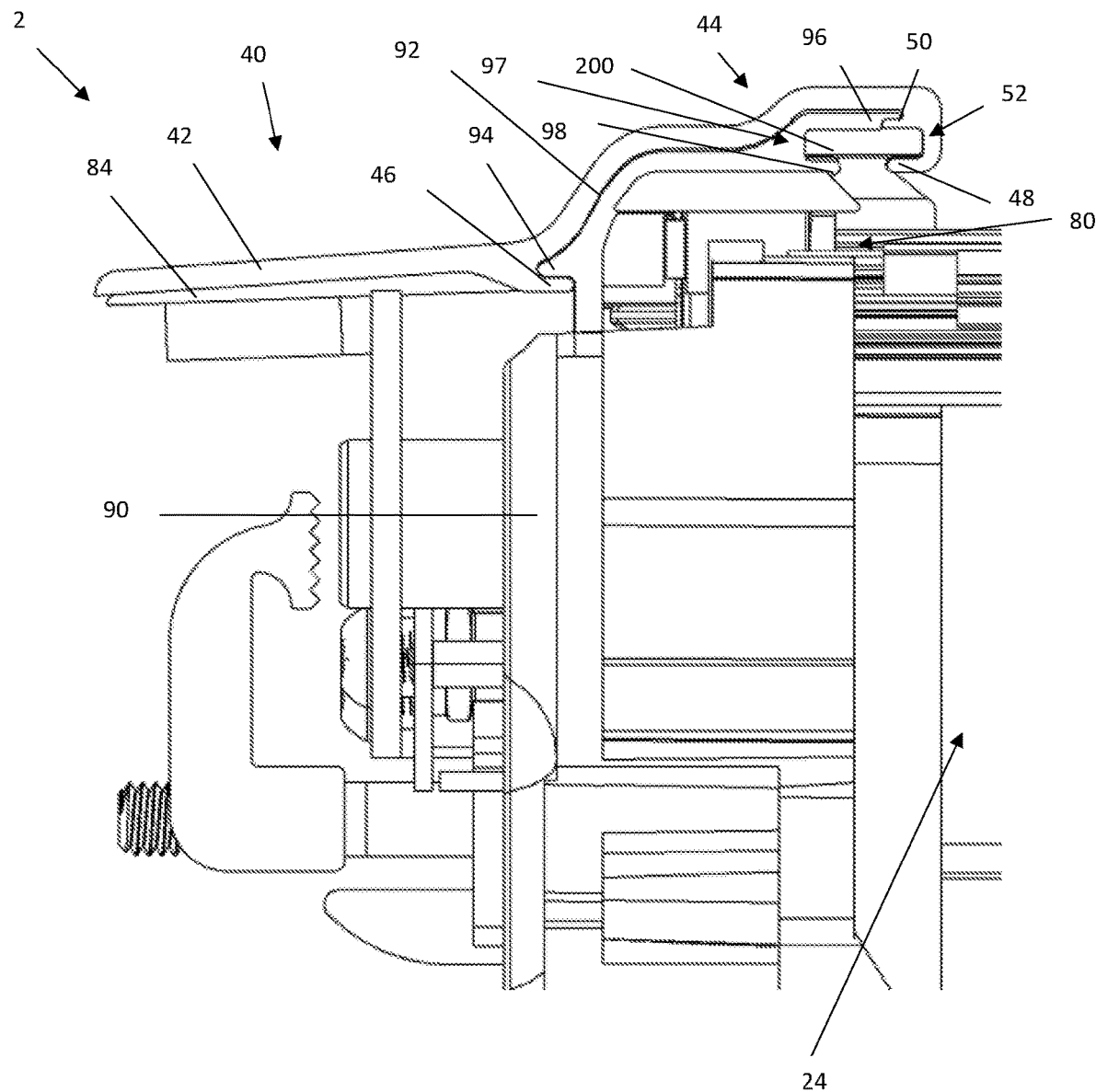
FIG. 9 is a plan view of one side of a tonneau system.

FIG. 9 is an end view of one side of a tonneau system 2. The tonneau system 2 includes a cap 40, a rail 80, and a cover 90 that are all interconnected together. The rail 80 is covered by the cover 90 and the cap 40 so that only the roller extension 84 is visible. The rail 80 is connected to a portion of the cap 40 and the cover 90 via a projection connector 200 that extends through the cap receptacle 52, the cover receptacle 97 and the roller recess (not shown). The cover 90 is located at an end of the canister (not shown) and forms one end of a space 24 within the canister. The cover 90 includes a cover cap 92 including a cover extension 94 that forms a connection with the extension clip 46. The cover cap 92 also includes a cover cap clip 96 and a cover finger 98 with a cover receptacle 97 formed there between. The cover receptacle 97 receives the projection connector 200 and the cover cap clip 96 extends along a first side and the cover finger 98 extends along a side of the projection connector 200. The cover cap clip 96 extends into the secondary cap clip 50 and connects the cover 90 to the cap 40. The cap 40 includes a cap extension 42 that as shown extends over a portion of the rail 80 to prevent fluids from penetrating into the canister when the canister is in the installed position. The cap 40 also includes a cap lock 44 that extends in a direction opposite the cap extension 42. The cap lock 44 includes the extension clip 46, primary cap clip 48, secondary cap clip 50, and a cap receptacle 52 located between the primary cap clip 48 and the secondary cap clip 50. The cap receptacle 52 receives a portion of the projection connect 200 to form a connection.

Figure 10:
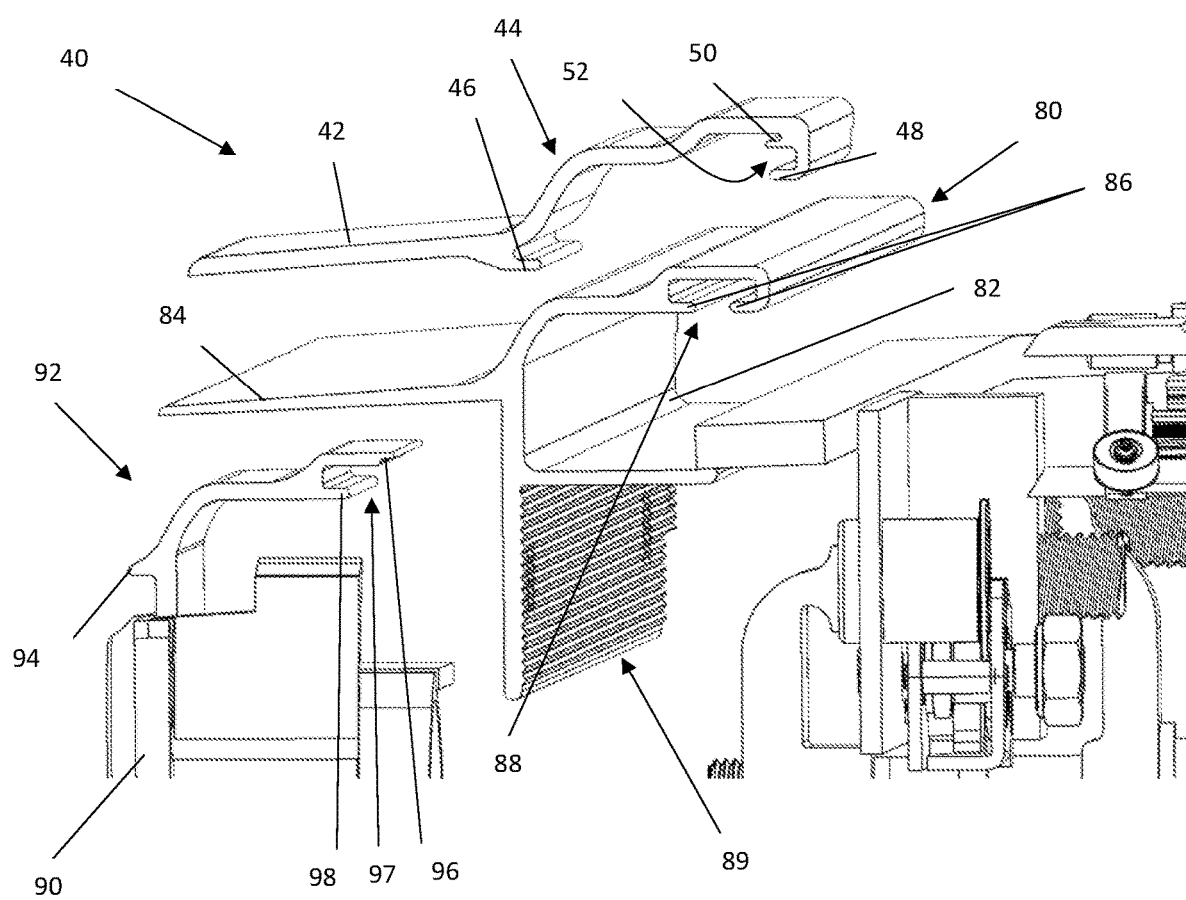
FIG. 10 is an exploded view of a side of a tonneau system.

FIG. 10 is a perspective exploded view of the cap 40, rail 80, and canister cover cap 90. When the cap 40, rail 80, and canister cover cap 90 are all in an installed position fluid is prevented from entering the bed through a region around the canister 20. The cap 40 includes a cap extension 42 connected to a cap lock 44. The cap lock 44 includes an extension clip 46, primary cap clip 48, secondary cap clip 50, and a cap receptacle 52 located between the primary cap clip 48 and secondary cap clip 50. The rail 80 includes a roller track 82 extending in a first direction with a roller extension 84 extending in a second direction. The roller extension 84 includes a pair of roller fingers 86 with a roller recess 88 located there between. A rail connector 89 extends below the roller track 82 and assists in connecting the rail 80 to the bed (not shown). The cover 90 includes a cover cap 92 extending in a first direction and a cover cap 94 extending in a second direction. The cover extension 94 includes a cover cap clip 96 and a cover finger 98 with a cover receptacle 98 formed therebetween.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Tonneau System
3 Tonneau cover
4 Tonneau Section
18 Handle
20 canister
22 track
24 Space
26 Direction of movement
30 Track guide
32 Guide Lock
34 Movement pocket
36 Guide neck
38 Track legs
39 Track opening
40 Cap
42 Cap Extension
44 Cap Lock
46 Extension Clip
48 Primary cap clip
50 Secondary cap clip
52 Cap receptacle
60 Rail Extension
62 Bearing
64 Canister Lock
66 Locked Position
68 Release arm
70 Removed Position
72 Locking tab (striker latch)
74 Locking jaw
80 rail
82 Roller track
84 roller extension
86 Roller fingers
88 Roller recess
89 Rail connector
90 cover
92 Cover cap
94 Cover extension
96 Cover cap clip
97 Cover receptacle
98 Cover finger
100 Closed position
110 Stored position
150 vehicle
152 bed
200 Projection connector

What is claimed is:

1. A canister comprising:
    a. a space configured to receive a tonneau cover so that the tonneau cover is stored within the canister; and
    b. one or more track guides that guide the canister relative to a roller track, a bed of a vehicle, a rail extension, a cap, or a combination thereof; and
    wherein the one or more track guides assist the canister in being inserted into or removed from the bed of the vehicle.

2. The canister of claim 1, wherein the one or more track guides include a guide lock that receives a bearing that locks the canister within the bed of the vehicle.

3. The canister of claim 1, wherein the one or more track guides include a movement pocket that receives a bearing when the canister is moved from a locked position to an unlocked position so that the canister is removable from the bed of the vehicle.

4. The canister of claim 1, wherein the one or more track guides include a guide neck that receives a bearing and guides the canister as the canister is removed from or is inserted into the bed of the vehicle.

5. The canister of claim 1, wherein the one or more track guides include two or more track legs defining a track opening that receives a bearing so that the canister connects to the bed of the vehicle, that releases the bearing so that the canister is removable from the bed of the vehicle, or both.

6. A tonneau system comprising the canister of claim 1, wherein the tonneau system includes one or more roller tracks that are connected to the bed of the vehicle and are in communication with the one or more track guides of the canister.

7. The tonneau system of claim 6, wherein the one or more roller tracks remain connected to the bed of the vehicle when the canister is removed from the bed of the vehicle.

8. The tonneau system of claim 6, wherein one or more rail extensions are connected to the one or more roller tracks, the bed of the vehicle, or both.

9. The tonneau system of claim 8, wherein the one or more rail extensions include one or more bearings that removably connect the canister to the bed of the vehicle by forming a connection with the one or more track guides.

10. The tonneau system of claim 9, wherein the one or more bearings are located within the one or more track guides and guide the canister into a locked position as the canister is inserted into the bed of the vehicle or guide the canister from the locked position to a removed position where the canister is removed from the bed of the vehicle.

11. The tonneau system of claim 8, wherein the one or more rail extensions include one or more canister locks that connect the canister to the one or more roller tracks, the one or more rail extensions, or both.

12. The tonneau system of claim 8, wherein one or more caps extend over the one or more roller tracks, the one or more rail extensions, or both and form a seal between the bed of the vehicle and the canister when the canister is in a locked position.

13. The tonneau system of claim 12, wherein the one or more caps include one or more cap extensions connected to one or more cap locks that connect the one or more caps to the canister, the one or more rail extensions, the one or more roller tracks, or a combination thereof.

14. A tonneau system comprising:
  a. a roller track that is configured to connect to a first side of a bed of a vehicle;
  b. a second roller track that is configured to connect to a second side of the bed of the vehicle;
  c. a rail extension connected to the roller track on the first side;
  d. a second rail extension connected to the second roller track on the second side;
  e. a canister including:
    i. a track guide on a first side of the canister in communication with the roller track and the rail extension on the first side, and
    ii. a second track guide on a second side of the canister in communication with the second roller track and the second rail extension on the second side; and
  f. a bearing connected to the rail extension and a second bearing connected to the second rail extension so that the bearing guides the canister as the canister is being inserted into or removed from the bed of the vehicle; wherein the roller track and the second roller track remain connected to the bed of the vehicle when the canister is removed from the bed of the vehicle.

15. The tonneau system of claim 14, wherein the track guide and the second track guide each include:
  a. a guide lock that receives a corresponding one of the bearing and the second bearing to lock the canister in a locked position;
  b. a movement pocket that receives the corresponding one of the bearing and the second bearing so that the canister is released from the locked position;
  c. a guide neck that allows the canister to rotate, move out of the bed, or both, and
  d. a track opening that releases the corresponding one of the bearing and the second bearing from between track legs so that the canister is movable to a removed position.

16. The tonneau system of claim 15, wherein the rail extension, the second rail extension, or both include a canister lock that prevents movement of the bearing, the second bearing, or both from the guide lock to the movement pocket.

17. The tonneau system of claim 16, wherein the tonneau system includes a cap that extends over the roller track, the rail extension, and the first side of the canister, and a second cap that extends over the second roller track, the second rail extension, and the second side of the canister so that that fluid, debris, or both are prevented from entering into the bed of the vehicle.

18. A method comprising:
  a. moving a canister in a first direction relative to one or more roller tracks, one or more rail extensions, or both so that a bearing moves relative to a track guide from a position within a guide lock of the track guide to a position within a movement pocket of the track guide;
  b. moving the canister in a second direction so that the bearing moves from the movement pocket to a guide neck of the track guide; and
  c. moving the canister in a third direction so that the bearing moves from the guide neck, along one or more track legs, and out of a track opening of the track guide;
  wherein the one or more roller tracks, the one or more rail extensions, or both are free of movement as the canister moves.

19. The method of claim 18, wherein the second direction and the third direction are parallel.

20. The method of claim 19, wherein the method includes a step of removing a cap from the canister, the one or more roller tracks, the one or more rail extensions, or a combination thereof; and releasing the canister by actuating canister lock, or both.

* * * * *